United States Patent
Jiang

(10) Patent No.: US 9,030,930 B2
(45) Date of Patent: May 12, 2015

(54) METHOD, APPARATUS, AND SYSTEM FOR SWITCHING COMMUNICATION PATH

(71) Applicant: Huawei Technologies Co., Ltd., Shenzhen, Guangdong (CN)

(72) Inventor: Ming Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 275 days.

(21) Appl. No.: 13/711,191

(22) Filed: Dec. 11, 2012

(65) Prior Publication Data

US 2013/0100800 A1   Apr. 25, 2013

Related U.S. Application Data

(63) Continuation of application No. PCT/CN2011/073772, filed on May 6, 2011.

(30) Foreign Application Priority Data

Jun. 11, 2010   (CN) .......................... 2010 1 0200719

(51) Int. Cl.
*H04L 1/16* (2006.01)
*H04L 12/707* (2013.01)
(Continued)

(52) U.S. Cl.
CPC .............. *H04L 45/22* (2013.01); *H04W 36/18* (2013.01); *H04W 76/043* (2013.01); *H04W 40/36* (2013.01)

(58) Field of Classification Search
CPC ............................. H04W 36/08; H04W 42/02
USPC .......................... 370/216–228, 237, 241–252
See application file for complete search history.

(56) References Cited

U.S. PATENT DOCUMENTS

2003/0058106 A1*   3/2003   Ikematsu .................. 340/568.1
2008/0130489 A1*   6/2008   Chao et al. .................... 370/219
(Continued)

FOREIGN PATENT DOCUMENTS

| CN | 1142881 A | 2/1997 |
|---|---|---|
| CN | 101426252 A | 5/2009 |
| WO | 2007099031 A1 | 9/2007 |

OTHER PUBLICATIONS

Foreign Communication from a Counterpart Application, PCT Application PCT/CN2011/073772, English Translation International Search Report dated Aug. 18, 2011, 4 pages.

(Continued)

*Primary Examiner* — Kan Yuen
(74) *Attorney, Agent, or Firm* — Conley Rose, P.C.; Grant Rodolph; Nicholas K. Beaulieu

(57) ABSTRACT

Embodiments of the present invention provide a method, an apparatus, and a system for switching a communication path. The method for switching a communication path includes: receiving, by an access network device, a data packet for implementing a communication service between a terminal and a first media source; learning, by the access network device, according to the data packet, that a local exchange path between the terminal and the first media source is unavailable; and transferring, by the access network device, the data packet via a detour path, where the data packet is also used by a channel control device on the detour path to control the terminal to disconnect from the detour path and establish a local exchange path between the terminal and a second media source, and where the second media source is in coverage of an access network device currently providing a service for the terminal.

10 Claims, 5 Drawing Sheets

(51) Int. Cl.
*H04W 76/04* (2009.01)
*H04W 40/36* (2009.01)
*H04W 36/18* (2009.01)

(56) References Cited

U.S. PATENT DOCUMENTS

2009/0059865 A1   3/2009   Zhang et al.
2009/0086643 A1   4/2009   Kotrla et al.
2010/0272067 A1*  10/2010  Lu et al. .................. 370/331
2013/0084871 A1*  4/2013   Kitaji et al. .................. 455/436

OTHER PUBLICATIONS

Foreign Communication from a Counterpart Application, PCT Application PCT/CN2011/073772, English Translation Written Opinion dated Aug. 18, 2011, 4 pages.

Foreign Communication From Counterpart Application, European Application 11791873.0, Extended European Search Report dated Apr. 9, 2013, 4 pages.

* cited by examiner

METHOD, APPARATUS, AND SYSTEM FOR SWITCHING COMMUNICATION PATH

CROSS-REFERENCE TO RELATED APPLICATIONS

This application is a continuation of International Application No. PCT/CN2011/073772, filed on May 6, 2011, which claims priority to Chinese Patent Application No. 201010200719.1, filed on Jun. 11, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the technical field of communications, and in particular, to a method, an apparatus, and a system for switching a communication path.

BACKGROUND

In order to reduce costs for transmission and forwarding of a mobile broadband (MBB) network, a local traffic exchange scheme may be used, that is, the existing network device in the network does not need to be moved, no new network device needs to be added, and only a function of supporting local traffic exchange is added in a source access network device. When the local traffic exchange condition is satisfied, the local traffic exchange is executed.

In the process in which a terminal moves in the prior art, when the terminal enters the coverage of a target access network device from the coverage of the source access network device, a local exchange path between the terminal and a source media source (e.g., Media X or MX for short) is interrupted. A detection time for the terminal to detect that the local exchange path between the terminal and the MX is interrupted is longer than a data buffer time of the terminal, so that communication service data acquired by the terminal is interrupted, thereby affecting the normal process of the communication service.

SUMMARY

Embodiments of the present invention provide a method, an apparatus, and a system for switching a communication path, which are used to, when a terminal enters the coverage of a target access network device from the coverage of a source access network device, avoid interruption of a terminal communication service due to interruption of a local exchange path between the terminal and a source media source, thereby ensuring the normal process of the communication service.

An embodiment of the present invention provides a method for switching a communication path, where the method includes: receiving, by an access network device, a data packet for implementing a communication service between a terminal and a first media source; learning, by the access network device, according to the data packet, that a local exchange path between the terminal and the first media source is unavailable; and transferring, by the access network device, the data packet via a detour path, where the data packet is also used by a channel control device on the detour path to control the terminal to disconnect from the detour path and establish a local exchange path between the terminal and a second media source, and where the second media source is in coverage of an access network device currently providing a service for the terminal.

An embodiment of the present invention provides another method for switching a communication path, where the method includes: acquiring, by a channel control device, via a detour path, a data packet for implementing a communication service between a terminal and a first media source, where the data packet is transferred by an access network device via the detour path after the access network device learns that a local exchange path between the terminal and the first media source is unavailable; learning, by the channel control device, according to the data packet, that the terminal is not in coverage of the first media source; and controlling, by the channel control device, the terminal to disconnect from the detour path and establish a local exchange path between the terminal and a second media source, where the second media source is in coverage of an access network device currently providing a service for the terminal.

An embodiment of the present invention also provides an access network device, where the device includes: a receiving module configured to receive a data packet for implementing a communication service between a terminal and a first media source; a learning module configured to learn, according to the data packet, that a local exchange path between the terminal and the first media source is unavailable; and a transfer module configured to transfer the data packet via a detour path, where the data packet is also used by a channel control device on the detour path to control the terminal to disconnect from the detour path and establish a local exchange path between the terminal and a second media source, and wherein the second media source is in coverage of an access network device currently providing a service for the terminal.

An embodiment of the present invention further provides a channel control device, where the device includes: an acquisition module configured to acquire, via a detour path, a data packet for implementing a communication service between a terminal and a first media source, where the data packet is transferred by an access network device via the detour path after the access network device learns that a local exchange path between the terminal and the first media source is unavailable; a learning module configured to learn, according to the data packet, that the terminal is not in coverage of the first media source; and a control module configured to control the terminal to disconnect from the detour path and establish a local exchange path between the terminal and a second media source, where the second media source is in coverage of an access network device currently providing a service for the terminal.

An embodiment of the present invention further provides a system for switching a communication path, where the system includes: an access network device configured to: receive a data packet for implementing a communication service between a terminal and a first media source; learn, according to the data packet, that a local exchange path between the terminal and the first media source is unavailable; and transfer the data packet via a detour path; and a channel control device configured to: acquire the data packet via the detour path; learn, according to the data packet, that the terminal is not in coverage of the first media source; and control the terminal to disconnect from the detour path and establish a local exchange path between the terminal and a second media source, where the second media source is in coverage of an access network device currently providing a service for the terminal.

It can be known from the technical solutions that, when the terminal enters the coverage of a second access network device from the coverage of a first access network device, after receiving the data packet uploaded by the terminal or delivered by the first media source, the access network device (e.g., the first access network device or the second access network device) of the embodiment of the present invention learns that the local exchange path between the terminal and the first media source is unavailable, and transfers the data packet via the detour path, thereby preventing interruption of the terminal communication service due to interruption of the local exchange path between the terminal and the first media source, and ensuring the normal process of the communication service.

BRIEF DESCRIPTION OF THE DRAWINGS

To illustrate the technical solutions in the embodiments of the present invention or in the prior art more clearly, the accompanying drawings required for describing the embodiments or the prior art are briefly described in the following. Apparently, the accompanying drawings in the following description merely show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following describes the technical solutions in the embodiments of the present invention clearly and completely with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
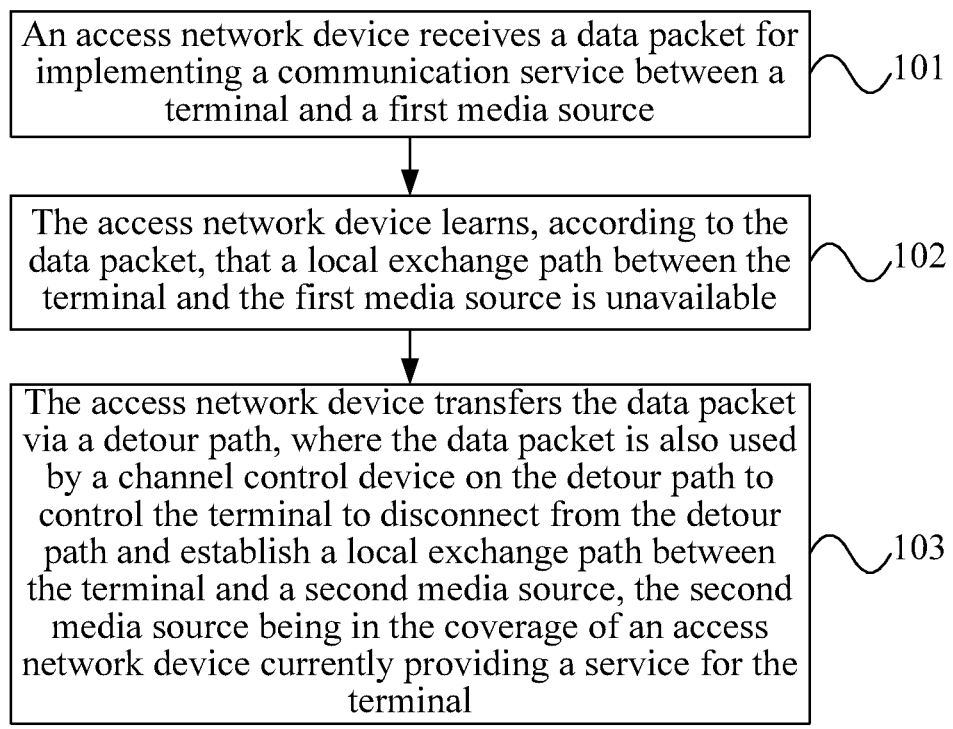
FIG. 1 is a schematic flowchart of a method for switching a communication path provided by Embodiment 1 of the present invention.

FIG. 1 is a schematic flowchart of a method for switching a communication path provided by Embodiment 1 of the present invention. The method for switching a communication path of this embodiment may be applicable to multiple types of mobile broadband networks, such as a long term evolution (LTE)/system architecture evolution (SAE) network, a wideband code division multiple access (WCDMA) network, a code division multiple access (CDMA) network, a mobile internet protocol (mobile IP) network, and a world interoperability for microwave access (WiMAX) network. As shown in FIG. 1, the method for switching a communication path of this embodiment may include the following steps:

Step 101: An access network device receives a data packet for implementing a communication service between a terminal and a first media source.

Step 102: The access network device learns, according to the data packet, that a local exchange path between the terminal and the first media source is unavailable.

In this step, the access network device may determine, according to a destination address in the data packet, whether the first media source or the terminal corresponding to the destination address is in coverage of the access network device. If the first media source or the terminal corresponding to the destination address is not in the coverage of the access network device, a local traffic exchange cannot be executed, so that the access network device learns that the local exchange path between the terminal and the first media source is unavailable.

Step 103: The access network device transfers the data packet via a detour path, where the data packet is also used by a channel control device on the detour path to control the terminal to disconnect from the detour path and establish a local exchange path between the terminal and a second media source, where the second media source is in coverage of an access network device currently providing a service for the terminal.

In this embodiment, the access network device may include a first access network device and a second access network device. When the access network device is the first access network device, that is, when the access network device is a source access network device, the first access network device receives a data packet delivered by the first media source to the terminal, and the first access network device learns that the local exchange path between the terminal and the first media source is unavailable and transfers, via the detour path, the data packet delivered by the first media source to the terminal; when the access network device is the second access network device, that is, when the access network device is a target access network device, the second access network device receives a data packet uploaded by the terminal to the first media source, and the second access network device learns that the local exchange path between the terminal and the first media source is unavailable and transfers, via the detour path, the data packet uploaded by the terminal to the first media source. In this embodiment, the terminal can establish, in the coverage of the first access network device, the local exchange path between the terminal and the first media source, that is, the terminal connects to the first access network device that connects to the first media source, so as to implement a local traffic exchange through the first access network device. In the process in which the terminal moves, the terminal gradually moves out of the coverage of the first access network device and enters the coverage of the second access network device. When the first access network device receives the data packet delivered by the first media source to the terminal, the first access network device determines, according to a destination address in the data packet, that the terminal corresponding to the destination address is not in the coverage of the first access network device and the local traffic exchange cannot be executed, so that the first access network device learns that the local exchange path between the terminal and the first media source is unavailable, and the first access network device may route the data packet to the terminal through the channel control device and the second access network device via a detour path, that is, the terminal connects to the second access network device that connects to the channel control device that connects to the first access network device that connects to the first media source; when the second access network device receives the data packet uploaded by the terminal to the first media source, the second access network device determines, according to the destination address in the data packet, that the first media source corresponding to the destination address is not in the coverage of the first media source and the local traffic exchange cannot be executed, so that the second access network device learns that the local exchange path between the terminal and the first media source is unavailable, and the second access network device may route the data packet to the first media source through the channel control device and the first access network device via a detour path, that is, the terminal connects to the second access network device that connects to the channel control device that connects to the first access network device that connects to the first media source. Specifically, in the embodiment of the present invention, the data packet may be routed to the terminal or the first media source via the detour path by presetting routing information on each network device corresponding to the detour path.

In this embodiment, when the terminal enters the coverage of the second access network device from the coverage of the first access network device, after receiving the data packet uploaded by the terminal or delivered by the first media source, the access network device (e.g., the first access network device or the second access network device) learns that the local exchange path between the terminal and the first media source is unavailable, and transfers the data packet via the detour path. The channel control device on the detour path receives the data packet uploaded by the terminal or delivered by the first media source, learns that the terminal still performs the communication service by using a non-local media source (e.g., a source media source), that is, the first media source, and controls the terminal to disconnect from the detour path between the terminal and the first media source and establish the local exchange path between the terminal and the second media source, thereby preventing interruption of the terminal communication service due to interruption of the local exchange path between the terminal and the source media source, and ensuring the normal process of the communication service.

Specifically, the channel control device may send disconnection and reconnection indication information to the terminal through a media controller and the first media source, or send the disconnection and reconnection indication information to the terminal directly through the first media source. The terminal may execute disconnection and reconnection operations according to an indication of the disconnection and reconnection indication information as follows:

A. First, disconnect from the detour path; then, establish the local exchange path between the terminal and the second media source through the media controller, that is, the terminal connects to the second access network device that connects to the second media source, so as to implement a local traffic exchange through the second access network device.

In the prior art, in the process in which the terminal moves, the terminal gradually moves out of the coverage of the first access network device and enters the coverage of the second access network device. Because the first access network device cannot continuously execute the local traffic exchange, the local exchange path between the terminal and the first media source is interrupted. Only after the terminal detects that the local exchange path between the terminal and the first media source is interrupted, establishment of the local exchange path between the terminal and the second media source is triggered again. Because a time from interruption of the local path between the terminal and the first media source to the establishment of the local exchange path between the terminal and the second media source is longer than a data buffer time of the terminal, communication service data transmitted between the terminal and the first media source is interrupted, thereby affecting the normal process of the communication service. Compared with the prior art, in the embodiment of the present invention, before the local exchange path between the terminal and the second media source is interrupted, the detour path for the communication service is established between the terminal and the first media source, so that the time of interruption of the path between the terminal and the first media source is shorter than the data buffer time of the terminal, thereby preventing interruption of the terminal communication service due to interruption of the local exchange path between the terminal and the source media source, and ensuring the normal process of the communication service.

B. First, establish the local exchange path between the terminal and the second media source through the media controller, that is, the terminal connects to the second access network device that connects to the second media source, so as to implement a local traffic exchange through the second access network device; then, disconnect from the detour path.

In the prior art, in the process in which the terminal moves, the terminal gradually moves out of the coverage of the first access network device and enters the coverage of the second access network device. Because the first access network device cannot continuously execute the local traffic exchange, the local exchange path between the terminal and the first media source is interrupted. Only after the terminal detects that the local exchange path between the terminal and the first media source is interrupted, establishment of the local exchange path between the terminal and the second media source is triggered again. Because the time from the interruption of the local path between the terminal and the first media source to the establishment of the local exchange path between the terminal and the second media source is far longer than the data buffer time of the terminal, communication service data transmitted between the terminal and the first media source is interrupted, thereby affecting the normal process of the communication service. Compared with the prior art, in the embodiment of the present invention, before the terminal performs data packet transmission with the second media source through the local exchange path, the terminal performs data packet transmission with the first media source through the detour path, thereby preventing interruption of the terminal communication service due to interruption of the local exchange path between the terminal and the source media source, and ensuring the normal process of the communication service.

The access network device of this embodiment may be an evolved NodeB (eNB), a serving gateway (S-GW), and a serving general packet radio service (GPRS) supporting node (SGSN) in an LTE/SAE network, may also be a NodeB, a radio network controller (RNC), and an SGSN in a WCDMA network, may also be a foreign agent (FA) in a mobile IP network, may also be a base transceiver station (BTS), a base station controller (BSC), and an SGSN in a CDMA network, and may also be a base station (BS) in a WiMAX network.

The channel control device of this embodiment may be a packet data network gateway (P-GW) in an LTE/SAE network, may also be a gateway GPRS supporting node (GGSN) in a WCDMA network, may also be home agency (HA) in a mobile IP network, may also be a packet data serving node (PDSN) in a CDMA network, and may also be an access service network gateway (ASN GW) in a WiMAX network.

Figure 2:
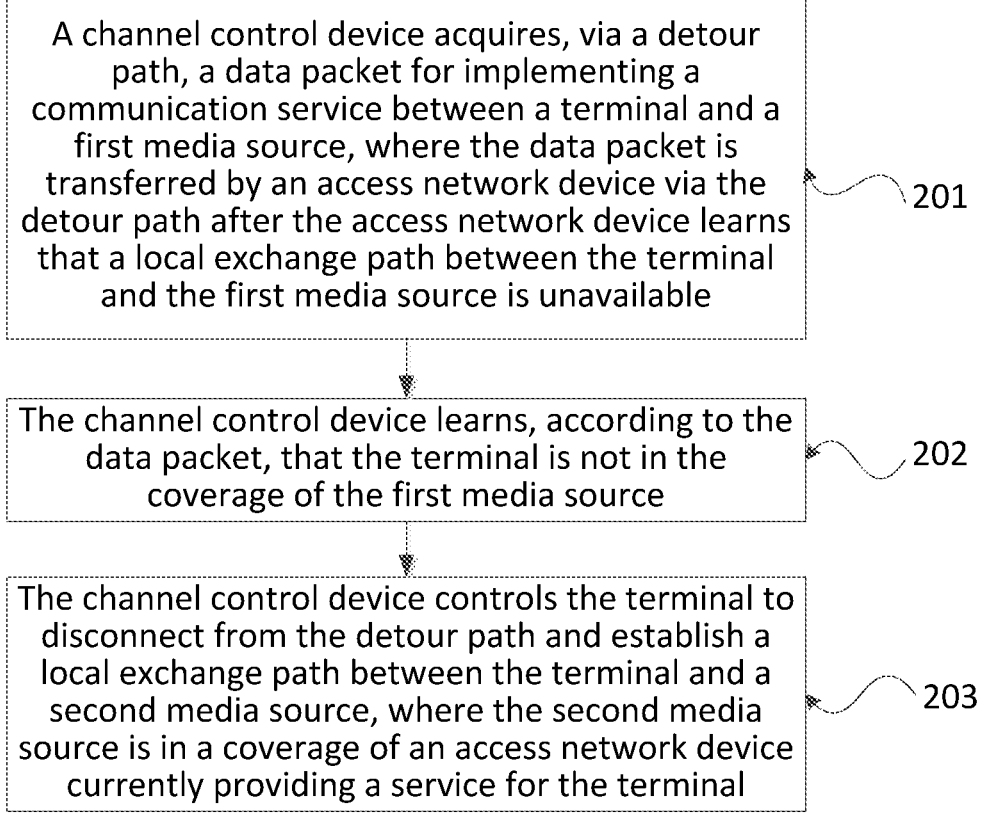
FIG. 2 is a schematic flowchart of another method for switching a communication path provided by Embodiment 2 of the present invention.

FIG. 2 is a schematic flowchart of another method for switching a communication path provided by Embodiment 2 of the present invention. The method for switching a communication path of this embodiment may be applicable to multiple types of mobile broadband networks, such as an LTE/SAE network, a WCDMA network, a CDMA network, a mobile IP network, and a WiMAX network. As shown in FIG. 2, the method for switching a communication path of this embodiment may include the following steps:

Step 201: A channel control device acquires, via a detour path, a data packet for implementing a communication service between a terminal and a first media source, where the data packet is transferred by an access network device via the detour path after the access network device learns that a local exchange path between the terminal and the first media source is unavailable.

Step 202: The channel control device learns, according to the data packet, that the terminal is not in coverage of the first media source.

In this step, the channel control device may learn location information of the terminal, for example, a routing region identifier, a serving region identifier or a cell identifier, and location information of the first media source, for example, a cell identifier list of a coverage region, according to a session context of a corresponding session for the terminal to transfer the data packet via the detour path and a source address or a destination address included in the data packet, that is, an IP address of the first media address. If the routing region identifier, the serving region identifier or the cell identifier of the terminal can match a corresponding cell identifier in the cell identifier list of the coverage region of the first media source, it can be learned that the terminal is in the coverage of the first media source; if the routing region identifier, the serving region identifier or the cell identifier of the terminal cannot match a corresponding cell identifier in the cell identifier list of the coverage region of the first media source, it can be learned that the terminal is not in the coverage of the first media source.

Step 203: The channel control device controls the terminal to disconnect from the detour path and establish a local exchange path between the terminal and a second media source, where the second media source is in coverage of an access network device currently providing a service for the terminal.

In this embodiment, the access network device may include a first access network device and a second access network device. When the access network device is the first access network device, that is, when the access network device is a source access network device, the first access network device receives a data packet delivered by the first media source to the terminal, and the first access network device learns that the local exchange path between the terminal and the first media source is unavailable and transfers, via the detour path, the data packet delivered by the first media source to the terminal; when the access network device is the second access network device, that is, when the access network device is a target access network device, the second access network device receives a data packet uploaded by the terminal to the first media source, and the second access network device learns that the local exchange path between the terminal and the first media source is unavailable and transfers, via the detour path, the data packet uploaded by the terminal to the first media source.

Specifically, the channel control device may send disconnection and reconnection indication information to the terminal through a media controller and the first media source, or send the disconnection and reconnection indication information to the terminal directly through the first media source. The terminal may execute disconnection and reconnection operations according to an indication of the disconnection and reconnection indication information as follows:

A. First, disconnect from the detour path; then, establish the local exchange path between the terminal and the second media source through the media controller, that is, the terminal connects to the second access network device that connects to the second media source, so as to implement a local traffic exchange through the second access network device.

In the prior art, in the process in which the terminal moves, the terminal gradually moves out of the coverage of the first access network device and enters the coverage of the second access network device. Because the first access network device cannot continuously execute the local traffic exchange, the local exchange path between the terminal and the first media source is interrupted. Only after the terminal detects that the local exchange path between the terminal and the first media source is interrupted, establishment of the local exchange path between the terminal and the second media source is triggered again. Because the time from the interruption of the local path between the terminal and the first media source to the establishment of the local exchange path between the terminal and the second media source is longer than the data buffer time of the terminal, communication service data transmitted between the terminal and the first media source is interrupted, thereby affecting the normal process of the communication service. Compared with the prior art, in the embodiment of the present invention, before the local exchange path between the terminal and the second media source is interrupted, the detour path for the communication service is established between the terminal and the first media source, so that the time of interruption of the path between the terminal and the first media source is shorter than the data buffer time of the terminal, thereby preventing interruption of the terminal communication service due to interruption of the local exchange path between the terminal and the source media source, and ensuring the normal process of the communication service.

B. First, establish the local exchange path between the terminal and the second media source through the media controller, that is, the terminal connects to the second access network device that connects to the second media source, so as to implement a local traffic exchange through the second access network device; then, disconnect from the detour path.

In the prior art, in the process in which the terminal moves, the terminal gradually moves out of the coverage of the first access network device and enters the coverage of the second access network device. Because the first access network device cannot continuously execute the local traffic exchange, the local exchange path between the terminal and the first media source is interrupted. Only after the terminal detects that the local exchange path between the terminal and the first media source is interrupted, establishment of the local exchange path between the terminal and the second media source is triggered again. Because a time from the interruption of the local path between the terminal and the first media source to the establishment of the local exchange path between the terminal and the second media source is far longer than the data buffer time of the terminal, communication service data transmitted between the terminal and the first media source is interrupted, thereby affecting the normal process of the communication service. Compared with the prior art, in the embodiment of the present invention, before the terminal performs data packet transmission with the second media source through the local exchange path, the terminal performs data packet transmission with the first media source through the detour path, thereby preventing interruption of the terminal communication service due to interruption of the local exchange path between the terminal and the source media source, and ensuring the normal process of the communication service.

Furthermore, the disconnection and reconnection indication information sent by the channel control device to the media controller may further include the location information of the terminal for the media controller to determine, according to the location information of the terminal, whether to send the disconnection and reconnection indication information to the first media source. If the media controller learns, according to the location information of the terminal, that the second media source exists in the coverage of the second access network device currently providing the service for the terminal, the media controller sends the disconnection and reconnection indication information to the first media source; if the media controller learns, according to the location information of the terminal, that the second media source does not exist in the coverage of the second access network device currently providing the service for the terminal, the media controller does not send the disconnection and reconnection indication information to the first media source.

In this embodiment, the terminal can establish, in the coverage of the first access network device, the local exchange path between the terminal and the first media source, that is, the terminal connects to the first access network device that connects to the first media source, so as to implement a local traffic exchange through the first access network device. In the process in which the terminal moves, the terminal gradually moves out of the coverage of the first access network device and enters the coverage of the second access network device. When the first access network device receives the data packet delivered by the first media source to the terminal, the first access network device determines, according to a destination address in the data packet, that the terminal corresponding to the destination address is not in the coverage of the first access network device and the local traffic exchange cannot be executed, so that the first access network device learns that the local exchange path between the terminal and the first media source is unavailable, and the first access network device may route the data packet to the terminal through the channel control device and the second access network device via a detour path, that is, the terminal connects to the second access network device that connects to the channel control device that connects to the first access network device that connects to the first media source; when the second access network device receives the data packet uploaded by the terminal to the first media source, the second access network device determines, according to the destination address in the data packet, that the first media source corresponding to the destination address is not in the coverage of the first media source and the local traffic exchange cannot be executed, so that the second access network device learns that the local exchange path between the terminal and the first media source is unavailable, and the second access network device may route the data packet to the first media source through the channel control device and the first access network device via a detour path, that is, the terminal connects to the second access network device that connects to the channel control device that connects to the first access network device that connects to the first media source. Specifically, in the embodiment of the present invention, the data packet may be routed to the terminal or the first media source via the detour path by presetting routing information on each network device corresponding to the detour path.

In this embodiment, when the terminal enters the coverage of the second access network device from the coverage of the first access network device, the channel control device acquires, via the detour path, the data packet uploaded by the terminal or delivered by the first media source, learns that the terminal still performs the communication service by using a non-local media source (e.g., a source media source), that is, the first media source, and controls the terminal to disconnect from the detour path between the terminal and the first media source and establish the local exchange path between the terminal and the second media source, thereby preventing interruption of the terminal communication service due to interruption of the local exchange path between the terminal and the source media source, and ensuring the normal process of the communication service.

The access network device of this embodiment may be an eNB, an S-GW, and an SGSN in an LTE/SAE network, may also be a NodeB, an RNC, and an SGSN in a WCDMA network, may also be an FA in a mobile IP network, may also be a BTS, a BSC, and an SGSN in a CDMA network, and may also be a BS in a WiMAX network.

The channel control device of this embodiment may be a P-GW in an LTE/SAE network, may also be a GGSN in a WCDMA network, may also be HA in a mobile IP network, may also be a PDSN in a CDMA network, and may also be an ASN GW in a WiMAX network.

Figure 3:
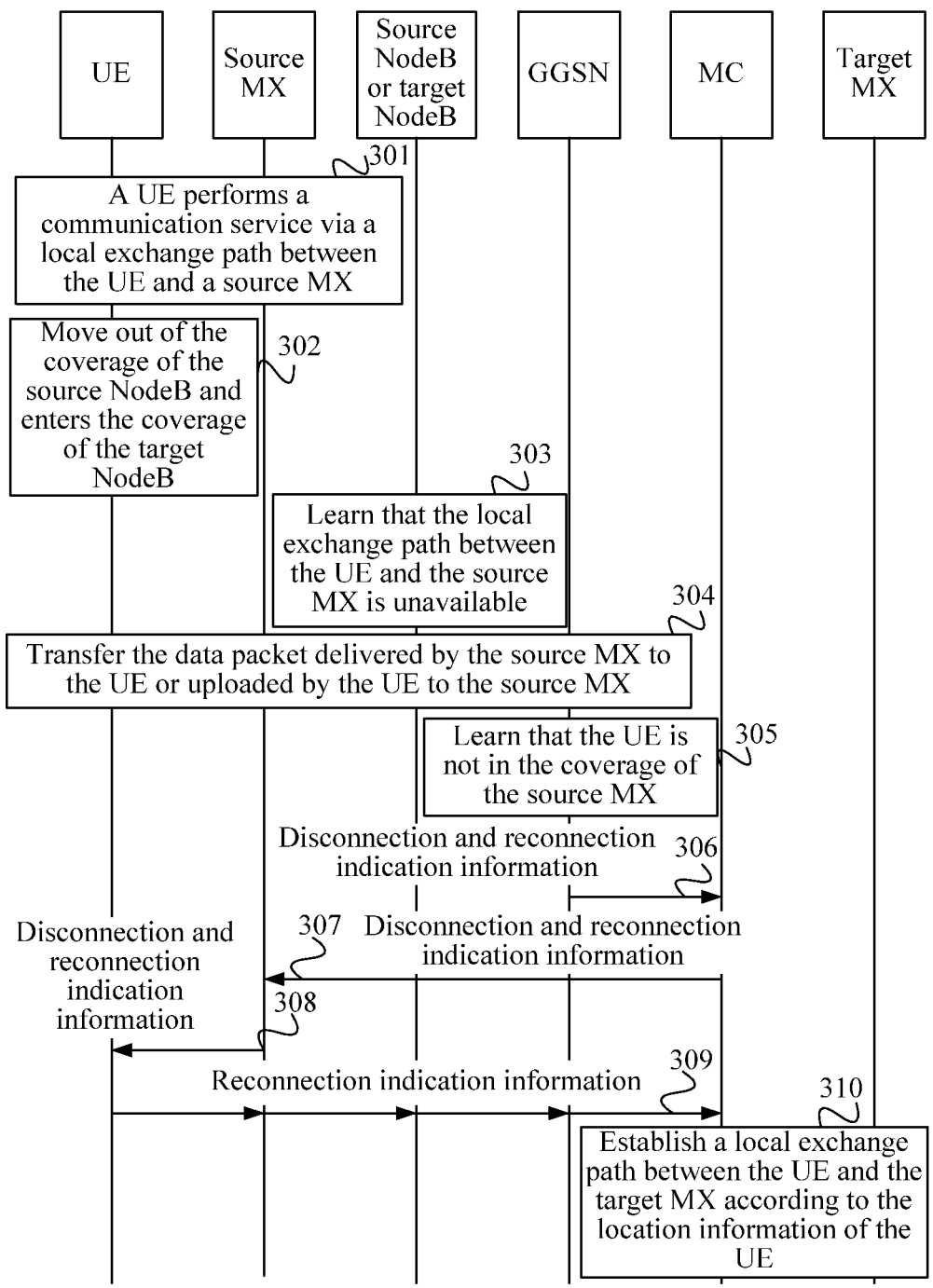
FIG. 3 is a schematic flowchart of a method for switching a communication path provided by Embodiment 3 of the present invention.

FIG. 3 is a schematic flowchart of a method for switching a communication path provided by Embodiment 3 of the present invention. The method for switching a communication path of this embodiment may be applicable to a scenario in which user equipment (UE) moves to the coverage of a target NodeB from a source base station NodeB, and the source NodeB and the target NodeB are both in the coverage of the same RNC in a WCDMA network. As shown in FIG. 3, the method for switching a communication path of this embodiment may include the following steps:

Step 301: A UE performs a communication service via a local exchange path between the UE and a source MX.

The communication service may include a media play service and/or a media download service.

In this step, the local exchange path between the UE and the source MX may be a communication connection capable of implementing a local traffic exchange, that is, the UE connects to a source NodeB that connects to the source MX.

Step 302: The UE moves out of the coverage of the source NodeB and enters the coverage of a target NodeB, and the source MX is not in the coverage of the target NodeB currently providing a service for the UE.

Step 303: The source NodeB receives a data packet delivered by the source MX to the UE and learns that the local exchange path between the UE and the source MX is unavailable; or the target NodeB receives a data packet uploaded by the UE to the source MX and learns that the local exchange path between the UE and the source MX is unavailable.

Step 304: The source NodeB transfers, via the detour path between the UE and the source MX, the data packet delivered by the source MX to the UE; or the target NodeB transfers, via the detour path between the UE and the source MX, the data packet uploaded by the UE to the source MX.

In this step, the detour path between the UE and the source MX may be a communication connection that does not implement a local traffic exchange, that is, the UE connects to the target NodeB that connects to an RNC that connects to a GGSN that connects to an RNC that connects to the source NodeB that connects to the source MX.

The communication connection that does not implement the local traffic exchange, that is, the detour path, is established by presetting routing information on each network device (e.g., the source NodeB, the target NodeB, the RNC, and the GGSN) corresponding to the detour path, that is, setting, on the source NodeB and the target NodeB, information of routing to the RNC; setting, on the RNC, information of routing to the GGSN, setting, on the RNC, information of routing from the MX to the source NodeB; and setting, on the GGSN, information of routing from the MX to the RNC. If the source NodeB or the target NodeB learns that the local exchange path between the UE and the source MX is unavailable, the UE communication service data may be forwarded via the detour path.

Step 305: The GGSN receives, via the detour path, the data packet uploaded by the UE to the source MX or delivered by the source MX to the UE, and learns, according to a session context of a corresponding session and a source address or a destination address of the data packet, that the UE is not in coverage of the source MX.

In this step, the source MX transfers the data packet to the UE through the source NodeB, the RNC, the GGSN, the RNC, and the target NodeB in sequence, and when acquiring the data packet, the GGSN may learn, according to the session context of the corresponding session and the source address of the data packet, that the UE is not in the coverage of the source MX; or the UE transfers the data packet to the source MX through the target NodeB, the RNC, the GGSN, the RNC, and the source NodeB in sequence, and when acquiring the data packet, the GGSN may learn, according to the session context of the corresponding session and the destination address of the data packet, that the UE is not in the coverage of the source MX.

Step 306: The GGSN sends disconnection and reconnection indication information to a media controller (MC).

The disconnection and reconnection indication information may include location information of the UE for the MC to determine, according to the location information of the UE, whether to send the disconnection and reconnection indication information to the source MX, that is, whether to execute step 307. If the MC learns, according to the location information of the UE, that a target MX exists in the coverage of the target NodeB currently providing a service for the UE, the MC executes step 307; if the MC learns, according to the location information of the UE, that no target MX exists in the coverage of the target NodeB currently providing a service for the UE, the MC does not execute step 307 and continuously transfers, via a detour route, the data packet uploaded by the UE to the source MX or delivered by the source MX to the UE.

Step 307: The MC sends the disconnection and reconnection indication information to the source MX.

Alternatively, in step 306, the GGSN may also directly send the disconnection and reconnection indication information to the source MX. Accordingly, in this embodiment, step 307 may not be executed, and step 308 is directly executed.

Step 308: The source MX sends the disconnection and reconnection indication information to the UE.

Step 309: The UE disconnects from the detour path between the UE and the source MX and sends reconnection indication information to the MC through the source NodeB, the RNC, and the GGSN in sequence, where the reconnection indication information includes the location information of the UE added by the GGSN.

Step 310: The MC establishes a local exchange path between the UE and the target MX according to the location information of the UE, where the target MX is in the coverage of the target NodeB currently providing a service for the UE.

In this step, the local exchange path between the UE and the target MX may be a communication connection for implementing a local traffic exchange, that is, the UE connects to a target NodeB that connects to the target MX.

Alternatively, in step 309 of this embodiment, the UE may also send the reconnection indication information to the MC through the source NodeB, the RNC, and the GGSN in sequence, and after the MC establishes the local exchange path between the UE and the target MX according to the location information of the UE in step 310, the UE disconnects from the detour path between the UE and the source MX.

In this embodiment, when the terminal enters the coverage of the target NodeB from the coverage of the source NodeB, after the source NodeB or the target NodeB receives the data packet uploaded by the UE or delivered by the source MX, the source NodeB or the target NodeB learns that the local exchange path between the UE and the source MX is unavailable and transfers the data packet via the detour path. The GGSN receives, via the detour path, the data packet uploaded by the UE or delivered by the source MX, learns that the UE still performs the communication service by using a non-local media source, that is, the source MX, and controls the UE to disconnect from the detour path between the UE and the source MX and establish the local exchange path between the UE and the target MX, thereby preventing interruption of the communication service acquired by the terminal due to interruption of the local exchange path between the UE and the source MX, and ensuring the normal process of the communication service.

A location of the source MX or the target MX is not limited in the embodiment of the present invention and may be in the coverage of any access network device, for example, an RNC or an SGSN.

It should be noted that, in this embodiment, the source NodeB and the target NodeB are described to identify only NodeBs before and after UE switching, and are not fixed. When the UE moves from the coverage of one NodeB (e.g., a first NodeB) to the coverage of the other NodeB (e.g., a second NodeB), the first NodeB may be called a source NodeB and the second NodeB may be called a target NodeB; when the UE moves from the coverage of the second NodeB to the coverage of the first NodeB, the second NodeB may be called a source NodeB and the first NodeB may be called a target NodeB. Similarly, in this embodiment, the source MX and the target MX are described to identify only MXs before and after UE switching, and are not fixed. When the UE moves from the coverage of one MX (e.g., a first MX) to the coverage of the other MX (e.g., a second MX), the first MX may be called a source MX and the second MX may be called a target MX; when the UE moves from the coverage of the second MX to the coverage of the first MX, the second MX may be called a source MX and the first MX may be called a target MX.

Furthermore, the embodiment of the present invention may further be applicable to a scenario in which the UE moves from the coverage of the source NodeB to the coverage of the target NodeB, and the source NodeB and the target NodeB are not in the coverage of the same RNC but in coverage of the same SGSN. By taking the source MX being in the coverage of the source NodeB and the target MX being in the coverage of the target NodeB as an example, the detour path between the UE and the source MX is the UE that connects to the target NodeB that connects to the target RNC that connects to the GGSN that connects to the source RNC that connects to the source NodeB that connects to the source MX, and the local exchange path between the UE and the target MX is the UE that connects to the target NodeB that connects to the target MX.

Furthermore, the embodiment of the present invention may further be applicable to a scenario in which the UE moves from the coverage of the source NodeB to the coverage of the target NodeB, and the source NodeB and the target NodeB are not in the coverage of the same RNC and not in the coverage of the same SGSN. By taking the source MX being in the coverage of the source NodeB and the target MX being in the coverage of the target NodeB as an example, the detour path between the UE and the source MX is the UE that connects to the target NodeB that connects to the target RNC that connects to the GGSN that connects to the source RNC that connects to the source NodeB that connects to the source MX, and the local exchange path between the UE and the target MX is the UE that connects to the target NodeB that connects to the target MX.

Figure 4:
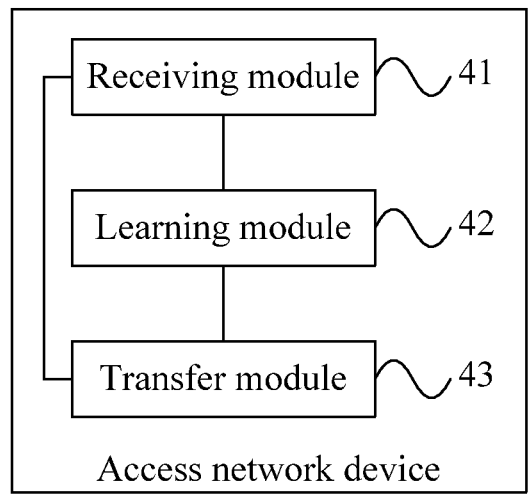
FIG. 4 is a schematic structural diagram of an access network device provided by Embodiment 4 of the present invention.

FIG. 4 is a schematic structural diagram of an access network device provided by Embodiment 4 of the present invention. As shown in FIG. 4, the access network device of this embodiment may include a receiving module 41, a learning module 42, and a transfer module 43. The receiving module 41 receives a data packet for implementing a communication service between a terminal and a first media source. The learning module 42 learns, according to the data packet received by the receiving module 41, that a local exchange path between the terminal and the first media source is unavailable. The transfer module 43 transfers, via a detour path, the data packet received by the receiving module 41, where the data packet is also used by a channel control device on the detour path to control the terminal to disconnect from the detour path and establish a local exchange path between the terminal and a second media source, the second media source being in the coverage of an access network device currently providing a service for the terminal.

Functions of the access network device in Embodiment 1 of the present invention and the source NodeB and the target NodeB in Embodiment 3 of the present invention can be all implemented by the access network device provided by this embodiment of the present invention.

In this embodiment, when the terminal enters the coverage of a second access network device from the coverage of a first access network device, after the receiving module receives the data packet uploaded by the terminal or delivered by the first media source, the learning module learns that the local exchange path between the terminal and the first media source is unavailable, and the transfer module transfers the data packet via the detour path. The channel control device on the detour path receives the data packet uploaded by the terminal or delivered by the first media source, learns that the terminal still performs the communication service by using a non-local media source (e.g., a source media source), that is, the first media source, and controls the terminal to disconnect from the detour path between the terminal and the first media source and establish the local exchange path between the terminal and the second media source, thereby preventing interruption of the terminal communication service due to interruption of the local exchange path between the terminal and the source media source, and ensuring the normal process of the communication service.

Furthermore, in this embodiment, the learning module 42 may be specifically configured to determine, according to a destination address in the data packet received by the receiving module 41, whether the first media source or the terminal corresponding to the destination address is in the coverage of the access network device; if the first media source or the terminal corresponding to the destination address is not in the coverage of the access network device, learn that the local exchange path between the terminal and the first media source is unavailable.

Figure 5:
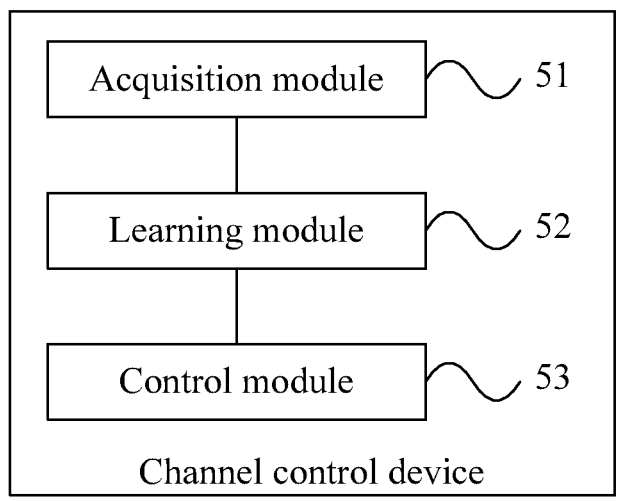
FIG. 5 is a schematic structural diagram of a channel control device provided by Embodiment 5 of the present invention.

FIG. 5 is a schematic structural diagram of a channel control device provided by Embodiment 5 of the present invention. As shown in FIG. 5, the channel control device of this embodiment may include an acquisition module 51, a learning module 52, and a control module 53. The acquisition module 51 acquires, via a detour path, a data packet for implementing a communication service between a terminal and a first media source, where the data packet is transferred by an access network device via the detour path after the access network device learns that a local exchange path between the terminal and the first media source is unavailable. The learning module 52 learns, according to the data packet acquired by the acquisition module 51, that the terminal is not in coverage of the first media source. The control module 53 controls the terminal to disconnect from the detour path and establish a local exchange path between the terminal and a second media source, where the second media source is in coverage of an access network device currently providing a service for the terminal.

Functions of the channel control device in Embodiment 1 of the present invention and the GGSN in Embodiment 3 of the present invention can be all implemented by the channel control device provided by this embodiment of the present invention.

In this embodiment, when the terminal enters the coverage of a second access network device from the coverage of a first access network device, the acquisition module acquires, via the detour path, the data packet uploaded by the terminal or delivered by the first media source, the learning module learns that the terminal still performs the communication service by using a non-local media source (e.g., a source media source), that is, the first media source, and the control module controls the terminal to disconnect from the detour path between the terminal and the first media source and establish the local exchange path between the terminal and the second media source, thereby preventing interruption of the terminal communication service due to interruption of the local exchange path between the terminal and the source media source, and ensuring the normal process of the communication service.

Furthermore, in this embodiment, the learning module 52 may be specifically configured to learn location information of the terminal and location information of the first media source according to a session context of a corresponding session for the terminal to transfer the data packet via the detour path and a source address or a destination address included in the data packet, and learn, according to the location information of the terminal and the location information of the first media source, that the terminal is not in the coverage of the first media source.

Furthermore, in this embodiment, the control module 53 may be specifically configured to control the terminal to disconnect from the detour path first and then establish the local exchange path between the terminal and the second media source, or control the terminal to establish the local exchange path between the terminal and the second media source first and then disconnect from the detour path.

Figure 6:
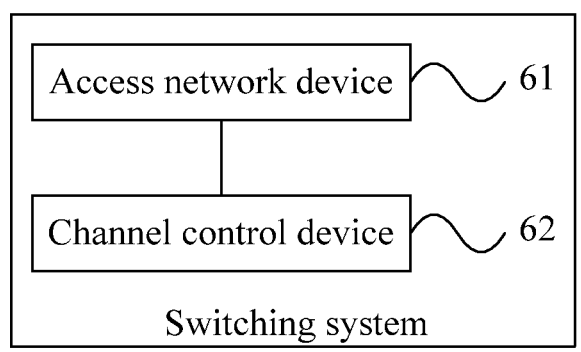
FIG. 6 is a schematic structural diagram of a system for switching a communication path provided by Embodiment 6 of the present invention.

FIG. 6 is a schematic structural diagram of a system for switching a communication path provided by Embodiment 6 of the present invention. As shown in FIG. 6, the system for switching a communication path of this embodiment may include an access network device 61 and a channel control device 62.

The access network device 61 is configured to receive a data packet for implementing a communication service between a terminal and a first media source; learn, according to the data packet, that a local exchange path between the terminal and the first media source is unavailable; and transfer the data packet via a detour path.

The channel control device 62 is configured to acquire the data packet via the detour path; learn, according to the data packet, that the terminal is not in coverage of the first media source; and control the terminal to disconnect from the detour path and establish a local exchange path between the terminal and a second media source, where the second media source is in coverage of an access network device currently providing a service for the terminal.

Functions of the access network device in Embodiment 1 of the present invention and the source NodeB and the target NodeB in Embodiment 3 of the present invention can be all implemented by the access network device 61 of the system for switching a communication path provided by this embodiment of the present invention; functions of the channel control device in Embodiment 2 of the present invention and the GGSN in Embodiment 3 of the present invention can be all implemented by the channel control device 62 of the system for switching a communication path provided by this embodiment of the present invention.

In this embodiment, when the terminal enters the coverage of the second access network device from the coverage of the first access network device, after receiving the data packet uploaded by the terminal or delivered by the first media source, the access network device (e.g., the first access network device or the second access network device) learns that the local exchange path between the terminal and the first media source is unavailable, and transfers the data packet via the detour path. The channel control device on the detour path receives the data packet uploaded by the terminal or delivered by the first media source, learns that the terminal still performs the communication service by using a non-local media source (e.g., a source media source), that is, the first media source, and controls the terminal to disconnect from the detour path between the terminal and the first media source and establish the local exchange path between the terminal and the second media source, thereby preventing interruption of the terminal communication service due to interruption of the local exchange path between the terminal and the source media source, and ensuring the normal process of the communication service.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are executed. The storage medium may be any medium that is capable of storing program codes, such as a read-only memory (ROM), a random-access memory (RAM), a magnetic disk, or an optical disk.

Finally, it should be noted that the above embodiments of the present invention are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent substitutions to some technical features thereof, without departing from the spirit and scope of the technical solution of the embodiments of the present invention.

What is claimed is:

1. A method for switching a communication path comprising:
   receiving, by a source access network device, a data packet for implementing a communication service between a terminal and a first media source;
   learning, by the source access network device, according to the data packet, that a local exchange path between the terminal and the first media source is unavailable; and
   transferring, by the source access network device, the data packet via a detour path,
   wherein the detour path comprises a path between the terminal and the first media source that passes through a target access network device, a channel control device, and the source access network device,
   wherein the data packet is used by the channel control device on the detour path to control the terminal to disconnect from the detour path and establish a local exchange path between the terminal and a second media source,
   wherein the second media source is in coverage of the target access network device, and
   wherein the target access network device is currently providing a service for the terminal.

2. The method according to claim 1, wherein the data packet for implementing the communication service between the terminal and the first media source comprises a data packet uploaded by the terminal to the first media source or delivered by the first media source to the terminal.

3. The method according to claim 1, wherein learning, by the source access network device, according to the data packet, that the local exchange path between the terminal and the first media source is unavailable comprises:
   determining, by the source access network device, according to a destination address in the data packet, whether the first media source or the terminal corresponding to the destination address is in coverage of the source access network device; and
   learning that the local exchange path between the terminal and the first media source is unavailable based at least in part on a determination that the first media source or the terminal corresponding to the destination address is not in the coverage of the source access network device.

4. The method according to claim 1, wherein transferring, by the source access network device, the data packet via the detour path comprises routing, by the source access network device, the data packet to the terminal or the first media source according to routing information preset on each network device corresponding to the detour path.

5. An access network device comprising:
   a transceiver configured to receive a data packet for implementing a communication service between a terminal and a first media source; and
   a processor configured to learn, according to the data packet, that a local exchange path between the terminal and the first media source is unavailable,
   wherein the transceiver is further configured to transfer the data packet via a detour path,
   wherein the detour path comprises a path between the terminal and the first media source that passes through a target access network device, a channel control device, and a source access network device, wherein the data packet is used by the channel control device on the detour path to control the terminal to disconnect from the detour path and establish a local exchange path between the terminal and a second media source, wherein the second media source is in coverage of the target access network device, and wherein the target access network device is currently providing a service for the terminal.

6. The access network device according to claim 5, wherein the processor is further configured to:

determine, according to a destination address in the data packet, whether the first media source or the terminal corresponding to the destination address is in coverage of the source access network device; and learn that the local exchange path between the terminal and the first media source is unavailable based at least in part on a determination that the first media source or the terminal corresponding to the destination address is not in the coverage of the source access network device.

7. A channel control device comprising:

a receiver configured to acquire, via a detour path, a data packet for implementing a communication service between a terminal and a first media source, wherein the detour path comprises a path between the terminal and the first media source that passes through a target access network device, the channel control device, and a source access network device, wherein the data packet is transferred by the source access network device via the detour path after the source access network device learns that a local exchange path between the terminal and the first media source is unavailable; and a processor configured to learn, according to the data packet, that the terminal is not in coverage of the first media source, wherein the processor is further configured to control the terminal to disconnect from the detour path and establish a local exchange path between the terminal and a second media source, wherein the second media source is in coverage of the target access network device, and wherein the target access network device is currently providing a service for the terminal.

8. The channel control device according to claim 7, wherein the processor is further configured to:

learn location information of the terminal and location information of the first media source according to a session context of a corresponding session for the terminal to transfer the data packet via the detour path and a source address or a destination address comprised in the data packet; and learn, according to the location information of the terminal and the location information of the first media source, that the terminal is not in the coverage of the first media source.

9. The channel control device according to claim 7, wherein the processor is further configured to control the terminal to disconnect from the detour path first and then establish the local exchange path between the terminal and the second media source.

10. The channel control device according to claim 7, wherein the processor is further configured to control the terminal to establish the local exchange path between the terminal and the second media source first and then disconnect from the detour path.

\* \* \* \* \*